(12) United States Patent
Gomez et al.

(10) Patent No.: US 8,165,967 B2
(45) Date of Patent: Apr. 24, 2012

(54) REQUEST MODIFICATION METHOD AND SYSTEM

(75) Inventors: Marco Antonio Marquez Gomez, Beacon, NY (US); Gautam Majumdar, Wappingers Falls, NY (US); Michael Randy May, Johnson City, NY (US); Muthusamy Palanisamy Muthusamy, Novi, MI (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 11/758,064

(22) Filed: Jun. 5, 2007

(65) Prior Publication Data

US 2008/0306748 A1 Dec. 11, 2008

(51) Int. Cl.
*G06Q 10/00* (2012.01)
(52) U.S. Cl. ...................................... 705/321
(58) Field of Classification Search .................. 705/320, 705/321
See application file for complete search history.

(56) References Cited

U.S. PATENT DOCUMENTS

| | | | |
|---|---|---|---|
| 5,551,880 A | 9/1996 | Bonnstetter et al. | |
| 6,289,340 B1 * | 9/2001 | Puram et al. | 707/5 |
| 6,385,620 B1 | 5/2002 | Kurzius et al. | |
| 6,785,679 B1 | 8/2004 | Dane et al. | |
| 7,043,443 B1 | 5/2006 | Firestone | |
| 7,080,057 B2 | 7/2006 | Scarborough et al. | |
| 7,117,165 B1 * | 10/2006 | Adams et al. | 705/26.4 |
| 2003/0163381 A1 * | 8/2003 | Spangler | 705/26 |
| 2004/0267606 A1 * | 12/2004 | Brishke et al. | 705/11 |
| 2005/0010467 A1 * | 1/2005 | Dietz et al. | 705/9 |
| 2005/0055226 A1 * | 3/2005 | Dane et al. | 705/1 |
| 2006/0047558 A1 * | 3/2006 | Uchiyama et al. | 705/9 |
| 2006/0106636 A1 * | 5/2006 | Segal | 705/1 |
| 2007/0016514 A1 * | 1/2007 | Al-Abdulqader et al. | 705/37 |
| 2007/0033186 A1 * | 2/2007 | Cinkle | 707/6 |

* cited by examiner

*Primary Examiner* — Jami A Plucinski
*Assistant Examiner* — Maame Ofori-Awuah
(74) *Attorney, Agent, or Firm* — Schmeiser, Olsen & Watts; William Schiesser

(57) ABSTRACT

A modification method and system. The method includes presenting by a computing system to a requester, templates associated with a candidate request. The computing system receives from the requester, first data associated with the candidate request. The computing system generates a request document comprising the first data. The computing system transmits the request document to at least one supplier. The computing system receives from the at least one supplier, a list of candidates. The computing system receives from the requester, a request for modifying the request document. The computing system generates in response to the request for modifying the request document, a modified request document comprising a modified version of the request document. The computing system receives from the requester, approval data approving a transmission of the modified request document.

31 Claims, 18 Drawing Sheets

| Review Request | /305 |
|---|---|
| Request details | |
| Project name | Resubmit Patent |
| Requesting company | Company A, U.S. |
| Requesting organization | Requesting organization |
| Status | Submitted |
| Is this a request for a government / federal contract? | No |
| Tracking number | None provided |
| Project coordinator (has all capabilities of requester) | None provided |
| Response reviewer | None provided |
| Submit type | T&M-Review: A "time and materials" request for specific skills where suppliers can submit multiple responses |
| Request type | Request for quotes (intent to buy ) |
| Accounting | Internal |
| Attachment | None |

Serviced 001 Application Developer

The table below summarizes this request. Click the name of the skill to view its details and associated responses.

| Skill request | Application Developer (Language A) — 310 |
|---|---|
| Response due date | 15 Nov 2006 |
| Status | Open |
| Level requested | Band 5 (Journeyman) |
| Quantity requested | 1 |
| Responses received: ☐ | 0 |
| Suppliers | Sent to supplier(s) -view response list — 315 |

Finalists for Application Developer ⟋308
If a finalist has an Approval reference number(ARN) or reviewer comments, the appropriate link will be present.

| Select | Pricing | Status | Candidate identification | Supplier | ARN |
|---|---|---|---|---|---|
| No responses have been added to the finalist list. | | | View responses to request. | | 325 |

[Hold request] [Cancel request] [Exit request] [Copy request] [Modify request]

Review skill request /405

| Request details |
|---|

The details below will apply to all skills you submit with this request.
Project name                Resubmit Patent
Requesting company        Company A, U.S.
Requesting organization     Organization A
Status                             Status
Is this a request for a      No
government / federal contract?
Tracking number            None provided
Project coordinator (has all  None provided
capabilities of requester)
Response reviewer         None providet
Submit type                 T&M-Review: A "time and materials"
                                  request for specific skills where suppliers
                                  can submit multiple responses
Request type                Request for quotes (intent to buy )
Accounting to be used       Internal
Attachment                  None
| Modify request details | ── 410

| Modify skill |
|---|

Click the description below to view/modify the skills of this request
(e.g., Modify supplier list, add additional skills,dates of request, etc.).
Note: Changes made will not impact responses in the fulfillment process.
Status legend
Changes resubmitted to supplier will not impact response received to date.

✓ Changes made will require suppliers to resubmit their responses.
  △ Response received to date will be removed from your view and suppliers
     will be notified to resubmit.                  /408

| Status | Number | Description | Level | Quantity | Planed Start Date | Planed End Date | Due Date |
|---|---|---|---|---|---|---|---|
|  | 001 | Application Developer ( Language A ) | Band 5 (Journeyman) | 1 | 11-Nov-2006 | 10-Nov-2006 | 15-Nov-2006 |

[Resubmission Request] [Cancel]

Review skill request

Request details

Complete the appropriate fields below and click the "Continue" button to proceed.
Required fields are marked with an asterisk (*) and must be filled in to complete the form.
Created on 10 Nov 2006 by American Author Company A for American Author Company A
The details below will apply to all skills you submit with this request.

Project name                 Resubmit Patent

Is this request for a       No
government / federal contract?

Tracking number

Project coordinator (has all   None provided
capabilities of requester): ☐  [Add] [Delete selected]

Response reviewer (can only  None provided
review responses):        ☐  [Add] [Delete selected]

Request type               Request for quote (intent to buy)

*Accounting to be used     Internal — Customer is Company A

Attachment:              [   ] [Delete selected] △ please ensure that Company A Confidential information and supplier specify information is not included in the attachment which may be provided to multiple suppliers

[Continue] [Cancel]

FIG. 5

Modify request

| Number | Description | Level | Quantity | Planned start date | Planned end date | Due date |
|---|---|---|---|---|---|---|
| 001 | Application Developer | Band 51 (Journeyman | | 11-Nov-2006 | 10-Nov-2007 | 15-Nov-2006 |

*Choose which section(s) of the above skill that you would like to modify and click "Continue".

<u>Check all</u>  <u>Uncheck all</u>

☑ Skill details, requirements, dates & time – Modify some details required, quantity, etc.), secondary skills, resource requirements (shift, coverage, etc.), dates and time (due date, start date, end date, straight time, overtime) and flowdown terms.

☑ Core and secondary skills–Add or modify core skill and secondary secondary skill and their required levels.

☐ Competitive bid – Modify competitive bid criterion for hot skills.

☑ Supplier selection and comments – Add, remove or modify suppliers, associated contracts, and comments to supplier.

[Continue] [Cancel]

FIG. 6

Modify Request     705a

| Primary job rate still set |
|---|

The table below summarizes this request. Click the name of the skill to view its details and associated responses.

Primary job category      Information Technology and Services
    Secondary job category      IT Specialist
    Job role
    Skill set      PeopleSoft
    Skill level      Band 5 (Journeyman)
    * Quantity of this skill needed: [1] (1 requested −0 already in fulfillment process)

Years of experience:
    Education requirement:

| Work location |
|---|

Work to be primarily performed at Other (e.g., customer location, remote office, etc.)
    Country/Territory      United States
    Address line 1:      123 Main St
    Address line 2:
    City      SAN FRANCISCO
    State/Region/Province      California
    State/Region/Province      94080

| Position details |
|---|

Provide Details about the resource requirement.
    Will this request be fulfilling      ○ Yes − this is a new requirement.
    a new requirement?:      ○ No − this is a replacing an existing requirement.
    Work shift:      ○ 1st shift
          ○ 2nd shift
          ○ 3rd shift
          ○ 4th shift
    Weekend coverage:      ☐ Weekend coverage is required.
    On-call coverage may be required.:      ☐ On call coverage is required.
    Travel:      ☐ Travel is required.
    Will client assets be loaned ?:      ○ Assets will be made available.
          ⊙ Assets will not be made available.

FIG. 7a

| Estimate of time to be worked |
|---|

The estimate for the hours or days shown below are based on the start date and end date provided on the previous page. You may alter the hours as necessary. (You may click the "Previous button to return to the previous page and change the dates.)

*Planned start date: [11▼] [Nov▼] [2006▼] ☐
*Planned end date: [10▼] [Nov▼] [2007▼] ☐
*Unit of measure: [Hour ▼]

| Recalculate based on dates and unit of measure |
|---|

*Straight time: [2,088.00]
*Overtime: [208.80]
*Response due date:  ○ 1 day (Urgent)
　　　　　　　　　　 ○ 2 days
　　　　　　　　　　 ○ 3 days
　　　　　　　　　　 ⦿ Other [15▼] [Nov▼] [2006▼]

| FIG. 7a |
|---|
| FIG. 7b |

FIG. 7

| Core skills |
|---|

Indicate the skills required for the core skills below. (You must rate at least one of these skills.) Rating more skills should result in better matches from the supplier.

Primary skills: Application Developer (Language A)

| Core skills for Applicant Developer | Level requested |
|---|---|
| Apply Knowledge of Business-IT Requirements | ▽ |
| Advise on Language A HRMS | ▽ |
| Advise on Language A Supply Chain | ▽ |
| Use Application Development Methodologies & Tools | ▽ |
| Perform Application Testing Activities | ▽ |
| Use Applications Strategies for Maintenance | ▽ |
| Implement a Language A Solution | ▽ |
| Use Language A Crystal Tool | ▽ |
| Use Programming Languages | ▽ |
| Use Code A for Solutions | ▽ |
| Use Full Life Cycle | ▽ |
| Develop Program Specifications | ▽ |
| Use Language A Query Tool | ▽ |
| Understand Data Models | ▽ |
| Use Library Management Tools | ▽ |
| Advise on Language A Financials | ▽ |
| Use Test Tools Knowledge | ▽ |
| Implement Vantive Language A 8 CRM Solution | 1 Knowledge/some job experience ▽ |

| Secondary/complementary skills |
|---|

Indicate any additional skills that candidates should possess (e.g., operating systems, applications, etc.).

Primary skill: Application Developer (Language A)

| | Core skills for Applicant Developer | Level requested |
|---|---|---|
| Add skills | Delete selected skills | |

┌─────────────────────────────────────────────────────────────┐ ⎯800
│ Review skill request                                        │
│ ┌─────────────────────────────────────────────────────────┐ │
│ │ Request details                                         │ │
│ └─────────────────────────────────────────────────────────┘ │
│ The details below will apply to all skills you submit with this request.
│ Project name              Resubmit Patent
│ Requesting company        Company A, U.S.
│ Requesting organization   Div A
│ Is this a request for a   No
│ goverment/federal contract?
│ Tracking number           None provided
│ Project coordinator (has all   None provided
│ capabilities of requester)
│ Response reviewer         None provided
│ Submit type               T&M-Review: A "time and materials"
│                           Request for specific skills where suppliers
│                           can submit multiple responses
│ Request type              Request for quotes (intent to buy)
│ Accounting to be used     Internal
│ Attachment ⎯162           None
│ ┌─────────────────────┐
│ │ Modify request details │ √Changes made to request details. Ready to submit.
│ └─────────────────────┘
│ ┌─────────────────────────────────────────────────────────┐
│ │ Modify skills                                           │
│ └─────────────────────────────────────────────────────────┘
│ Click the description below to view/modify the skills of this request
│ (e.g., Modify supplier list, add additional skills, dates of request, etc.).
│ Note: Changes made will not impact responses in the fulfillment process.
│
│ Status legend
│ √ Changes resubmitted to supplier will not impact response received to date.
│ △ Changes made will require suppliers to resubmit their responses.
│   Responses received to date will be removed from your view and suppliers
│   Will be notified to resubmit.
│ x Item not eligible for resubmit (i.e., line item is fulfilled or supplier is
│   not configured).

| Status | Number | Description | Level | Quantity | Planned start date | Planned end date | Due Date |
|---|---|---|---|---|---|---|---|
| √ | 001 | Application Developer ( Language A ) | Band 5 (Journeyman) | 1 | 11-Nov-2006 | 10-Nov-2006 | 15-Nov-2006 |

⎯161                                    [ Resubmit Request ]  [ Cancel ]

FIG. 8

```
                                                                              900
                       ┌901                                                    ┘
10 Nov 2006    │ S2288L │    Project A     RFQ     Submitted    0 of 6
```

FIG. 9

```
                                                                      150
                                                                       ┘
┌─────────────────────────────────────────────────────────────────────────┐
│ │Service 001 Application Developer                                    │ │
│ The table below summarizes this skill request. Click the name of the skill
│ to view its details and associated responses.
│ Skill requested              Application Developer
│ Response due date            15 Nov 2006
│ Status                       Band 5 (Journeyman)
│ Quantity requested           1
│ Responses received: ☐        0
│ Suppliers                    Sent to supplier(s) - view response list
│
│ Finalists for Application Developer
│ If a finalist has an    Approval reference number (ARN) or reviewer
│ comments, the appropriate link will be present.
│ ┌────────┬─────────┬────────┬──────────────────────┬──────────┬──────┐
│ │ Select │ Pricing │ Status │ Candidate identification │ Supplier │ ARN# │
│ ├────────┼─────────┼────────┴──────────────────────┴──────────┴──────┤
│ │ No responses │ View                                                 │
│ │ have been    │ responses                                            │
│ │ added to the │ to request                                           │
│ │ finalist list.                                                 155  │
│ │                                                                  ┘  │
│ ┌──────────────┬────────────────┬──────────────┬──────────────┬──────┐│
│ │ Hold request │ Cancel request │ Exit request │ Copy request │Modify reqest││
│ └──────────────┴────────────────┴──────────────┴──────────────┴──────┘│
└─────────────────────────────────────────────────────────────────────────┘
```

☑ Skill details, requirements, dates & time – Modify some details associated with the primary skill (level required, quantity, etc.),secondary skills, resource requirement (shift, coverage, etc.), dates and time (due date, start date, end date, straight time, overtime) and flowdown terms.
☐ Core and secondary skills – Add or modify core skills and secondary skill and their required levels.
☐ Competitive bid – Modify competitive bid criterion for hot skills.
☐ Supplier selection and comments – Add, remove or modify suppliers, associated contracts, and comments to supplier.

☑ Skill details, requirements, dates & time – Modify some details associated with the primary skill (level required, quantity, etc.),secondary skills, resource requirement (shift, coverage, etc.), dates and time (due date, start date, end date, straight time, overtime) and flowdown terms.
☑ Core and secondary skills – Add or modify core skills and secondary skill and their required levels.
☐ Competitive bid – Modify competitive bid criterion for hot skills.
☐ Supplier selection and comments – Add, remove or modify suppliers, associated contracts, and comments to supplier.

☐ Skill details, requirements, dates & time – Modify some details associated with the primary skill (level required, quantity, etc.),secondary skills, resource requirement (shift, coverage, etc.), dates and time (due date, start date, end date, straight time, overtime) and flowdown terms.
☐ Core and secondary skills – Add or modify core skills and secondary skill and their required levels.
☐ Competitive bid – Modify competitive bid criterion for hot skills.
☑ Supplier selection and comments – Add, remove or modify suppliers, associated contracts, and comments to supplier.

FIG. 13

| Estimate of time to be worked | |
|---|---|
| *Planned start date: | [11 ▽] [Nov ▽] [2006 ▽] ☐ |
| *Planned end date: | [10 ▽] [Nov ▽] [2007 ▽] ☐ |
| *Unit of measure | [Hour ▽] |
| | Recalculate based on dates and unit of measure |
| *Straight time: | [2,088.00] |
| *Overtime | [208.80] |
| *Response due date: | ○ 1 day (Urgent) |
| | ○ 2 days |
| | ○ 3 days |
| | ⊙ Other [15 ▽] [Nov ▽] [2006 ▽] |

FIG. 14      560

| Core skills for Application Developer | Level requested |
|---|---|
| Apply Knowledge of Business-IT Requirements | 2 Significant job experience ▽ |
| Advise on HRMS | 1 Knowledge/some job experience ▽ |
| Advise on Supply Chain | 0 No Experiance ▽ |
| Use Application Development Methodologies & Tools | 2 Significant job experience ▽ |
| Perform Application Testing Activities | 2 Significant job experience ▽ |
| Use Applications Strategies for Maintenance | 2 Expert, can lead others ▽ |
| Implement a Solution | 1 Knowledge/some job experience ▽ |
| | ▽ |

FIG. 15      760

☑ =Supplier has already been sent the request. to cancel from a supplier, uncheck the supplier.
Select the supplier to whom this request should be sent
   Select all   Deselect all     Reset to suppliers who have received request
✓ ☑  US TEST VENDOR 1
✓ ☑  US Test Supplier 1
   ☑  US Test Supplier 1

FIG. 16

✓ =Supplier has already been sent the request. To cancel from a supplier, uncheck the supplier.
Select the supplier to whom this request should be sent
   Select all   Deselect all      Reset to suppliers who have received request
✓ ☑ US TEST VENDOR 1
✓ ☐ US Test Supplier 1

☐ US Test Supplier 1

The details below will apply in all skills submitted with this request.

| | |
|---|---|
| Project name | Resubmit Patent |
| Is this a request for a goverment/federal contract? | No |
| Tracking number | |
| Project coordinator (has all capabilities of requester):☐ | None provided [Add] [Delete selected] |
| Response reviewer (can only review responses): ☐ | None provided [Add] [Delete selected] |
| Request type | Request for quote (intent to buy) |
| *Accounting to be used | Internal – Customer is Company A |
| Attachment: | [_____][Browse] △ Please ensure that Confidential information and supplier specific information is not included in the attachment which may be provided to multiple suppliers |

FIG. 18

```
                                                                    980
┌─────────────────────────────────────────────────────────────┐
│ Response reviewer          None provided                    │
│ Submit type                T&M-Review: A "time and materials"│
│                            Request for specfic skills where suppliers
│                            can submit multible responses    │
│ Request type               Request for quotes (intent to buy)│
│ Accounting to be used      Internal                         │
│ Attachment                 None                             │
```

| Modify request details | √Changes made to request details. Ready to submit. |

| Modify skills |

Click the description below to view/modify the skills of this request (e.g., Modify supplier list, add additional skills, dates of request, etc.). Note:Changes made will not impact responses in the fullfilment process.

Status legend
√ Changes resubmitted to supplier will not impact response received to date.

△ Changes made will require suppliers to resubmit their responses. Responses received to date will be removed from your view and suppliers will be notified to resubmit.

x Item not eligible for resubmit (i.e., line item is fulfilled or supplier is not configured).

| Status | Number | Description | Level | Quantity | Planned start date | Planned end date | Due Date |
|---|---|---|---|---|---|---|---|
| √ | 001 | Application Developer (Language A) | 5 (Journeyman) | 1 | 11-Nov-2006 | 10-Nov-2006 | 15-Nov-2006 |

982 — | Resubmission Request | | Cancel |

FIG. 19

REQUEST MODIFICATION METHOD AND SYSTEM

FIELD OF THE INVENTION

The present invention relates to a method and associated system for modifying a request for candidates.

BACKGROUND OF THE INVENTION

Changing a request for selecting a suitable individual to perform functions typically requires a process that may be complicated and inaccurate. When an entity makes a request to an agency for providing an individual to perform functions for the entity, the request may require specified changes in order to select the most qualified individual. Modifying the request may be very time consuming and require many resources to perform the task of modifying the request. Accordingly, there exists a need in the art to overcome the deficiencies and limitations described herein above.

SUMMARY OF THE INVENTION

The present invention provides a modification method comprising:

presenting, by a computing system to a requester, a request details template associated with a candidate request, said computing system comprising a memory device, said memory device comprising said request details template, a skills details template associated with said candidate request, a first list of candidate skills, and a first list of suppliers, said request details template comprising a plurality of request details questions, said skills details template comprising a plurality of skills details questions;

receiving, by said computing system from said requester, first request details data associated with said request details template;

presenting, by said computing system, said first list of candidate skills to said requester;

receiving from said requester, by said computing system, a first selection of a first candidate skill from said first list of candidate skills;

presenting, by said computing system, said skills details template to said requester;

receiving from said requester, by said computing system, first skills details data associated with said skills details template;

presenting, by said computing system, said first list of suppliers to said requester;

receiving from said requester, by said computing system, a first selection of at least a first supplier from said first list of suppliers;

generating, by said computing system, a request document comprising said first selection of said first candidate skill, said first selection of said at least said first supplier, said first skills details data, and said first request details data;

transmitting, by said computing system, said request document to said at least said first supplier;

receiving from said at least said first supplier, by said computing system, a first list of candidates, each candidate of said first list of candidates associated with said request document;

presenting, by said computing system, said first list of candidates to said requester;

receiving, from said requester, by said computing system, event modification data;

receiving from said requester, by said computing system, a request for modifying said request document;

generating, by said computing system in response to said request for modifying said request document, a modified request document comprising a modified version of said request document; and receiving from said requester, by said computing system, approval data approving a transmission of said modified request document.

The present invention provides a computing system comprising a processor coupled to a computer-readable memory unit, said memory unit comprising a request details template, a skills details template, a first list of candidate skills, a first list of suppliers, and instructions that when executed by the processor implement a modification method, said request details template comprising a plurality of request details questions, said skills details template comprising a plurality of skills details questions, said method comprising:

presenting, by said computing system to a requester, said request details template;

receiving, by said computing system from said requester, first request details data associated with said request details template;

presenting, by said computing system, said first list of candidate skills to said requester;

receiving from said requester, by said computing system, a first selection of a first candidate skill from said first list of candidate skills;

presenting, by said computing system, said skills details template to said requester;

receiving from said requester, by said computing system, first skills details data associated with said skills details template;

presenting, by said computing system, said first list of suppliers to said requester;

receiving from said requester, by said computing system, a first selection of at least a first supplier from said first list of suppliers;

generating, by said computing system, a request document comprising said first selection of said first candidate skill, said first selection of said at least said first supplier, said first skills details data, and said first request details data;

transmitting, by said computing system, said request document to said at least said first supplier;

receiving from said at least said first supplier, by said computing system, a first list of candidates, each candidate of said first list of candidates associated with said request document;

presenting, by said computing system, said first list of candidates to said requester;

receiving, from said requester, by said computing system, event modification data;

receiving from said requester, by said computing system, a request for modifying said request document;

generating, by said computing system in response to said request for modifying said request document, a modified request document comprising a modified version of said request document; and receiving from said requester, by said computing system, approval data approving a transmission of said modified request document.

The present invention provides a computer program product, comprising a computer usable medium comprising a request details template, a skills details template, a first list of candidate skills, a first list of suppliers, and a computer readable program code embodied therein, said request details template comprising a plurality of request details questions, said skills details template comprising a plurality of skills details questions, said computer readable program code adapted to implement a modification method within a computing system, said method comprising:

presenting, by said computing system to a requester, said request details template;

receiving, by said computing system from said requester, first request details data associated with said request details template;

presenting, by said computing system, said first list of candidate skills to said requester;

receiving from said requester, by said computing system, a first selection of a first candidate skill from said first list of candidate skills;

presenting, by said computing system, said skills details template to said requester;

receiving from said requester, by said computing system, first skills details data associated with said skills details template;

presenting, by said computing system, said first list of suppliers to said requester;

receiving from said requester, by said computing system, a first selection of at least a first supplier from said first list of suppliers;

generating, by said computing system, a request document comprising said first selection of said first candidate skill, said first selection of said at least said first supplier, said first skills details data, and said first request details data;

transmitting, by said computing system, said request document to said at least said first supplier;

receiving from said at least said first supplier, by said computing system, a first list of candidates, each candidate of said first list of candidates associated with said request document;

presenting, by said computing system, said first list of candidates to said requester;

receiving, from said requester, by said computing system, event modification data;

receiving from said requester, by said computing system, a request for modifying said request document;

generating, by said computing system in response to said request for modifying said request document, a modified request document comprising a modified version of said request document; and receiving from said requester, by said computing system, approval data approving a transmission of said modified request document.

The present invention provides a process for supporting computer infrastructure, said process comprising providing at least one support service for at least one of creating, integrating, hosting, maintaining, and deploying computer-readable code in a computing system comprising a memory unit, said memory unit comprising a request details template, a skills details template, a first list of candidate skills, and a first list of suppliers, said request details template comprising a plurality of request details questions, said skills details template comprising a plurality of skills details questions, wherein the code in combination with the computing system is capable of performing a modification method, said method comprising:

presenting, by said computing system to a requester, said request details template;

receiving, by said computing system from said requester, first request details data associated with said request details template;

presenting, by said computing system, said first list of candidate skills to said requester;

receiving from said requester, by said computing system, a first selection of a first candidate skill from said first list of candidate skills;

presenting, by said computing system, said skills details template to said requester;

receiving from said requester, by said computing system, first skills details data associated with said skills details template;

presenting, by said computing system, said first list of suppliers to said requester;

receiving from said requester, by said computing system, a first selection of at least a first supplier from said first list of suppliers;

generating, by said computing system, a request document comprising said first selection of said first candidate skill, said first selection of said at least said first supplier, said first skills details data, and said first request details data;

transmitting, by said computing system, said request document to said at least said first supplier;

receiving from said at least said first supplier, by said computing system, a first list of candidates, each candidate of said first list of candidates associated with said request document;

presenting, by said computing system, said first list of candidates to said requester;

receiving, from said requester, by said computing system, event modification data;

receiving from said requester, by said computing system, a request for modifying said request document;

generating, by said computing system in response to said request for modifying said request document, a modified request document comprising a modified version of said request document; and receiving from said requester, by said computing system, approval data approving a transmission of said modified request document.

The present invention advantageously provides a method and associated system capable of changing a request for selecting a suitable individual to perform functions.

BRIEF DESCRIPTION OF THE DRAWINGS

FIG. 3 illustrates an example of a computer screen shot associated with a first step of the algorithm of FIG. 2, in accordance with embodiments of the present invention.

FIG. 4 illustrates an example of a computer screen shot associated with a second step of the algorithm of FIG. 2, in accordance with embodiments of the present invention.

FIG. 5 illustrates an example of a first additional computer screen shot with the second step of FIG. 2, in accordance with embodiments of the present invention.

FIG. 6 illustrates an example of a second additional computer screen shot with the second step of FIG. 2, in accordance with embodiments of the present invention.

FIGS. 7a-7d illustrates portions of a third additional computer screen shot with the second step of FIG. 2, in accordance with embodiments of the present invention.

FIG. 8 illustrates an example of a fourth additional computer screen shot with the second step of FIG. 2, in accordance with embodiments of the present invention.

FIG. 9 illustrates a first sample computer screen shot, in accordance with embodiments of the present invention.

FIG. 10 illustrates a second sample computer screen shot, in accordance with embodiments of the present invention.

FIG. 11 illustrates a third sample computer screen shot, in accordance with embodiments of the present invention.

FIG. 12 illustrates a fourth sample computer screen shot, in accordance with embodiments of the present invention.

FIG. 13 illustrates a fifth sample computer screen shot, in accordance with embodiments of the present invention.

FIG. 14 illustrates a sixth sample computer screen shot, in accordance with embodiments of the present invention.

FIG. 15 illustrates a seventh sample computer screen shot, in accordance with embodiments of the present invention.

FIG. 16 illustrates an eighth sample computer screen shot, in accordance with embodiments of the present invention.

FIG. 17 illustrates a ninth sample computer screen shot, in accordance with embodiments of the present invention.

FIG. 18 illustrates a tenth sample computer screen shot, in accordance with embodiments of the present invention.

FIG. 19 illustrates an eleventh sample computer screen shot, in accordance with embodiments of the present invention.

DETAILED DESCRIPTION OF THE INVENTION

Figure 1:
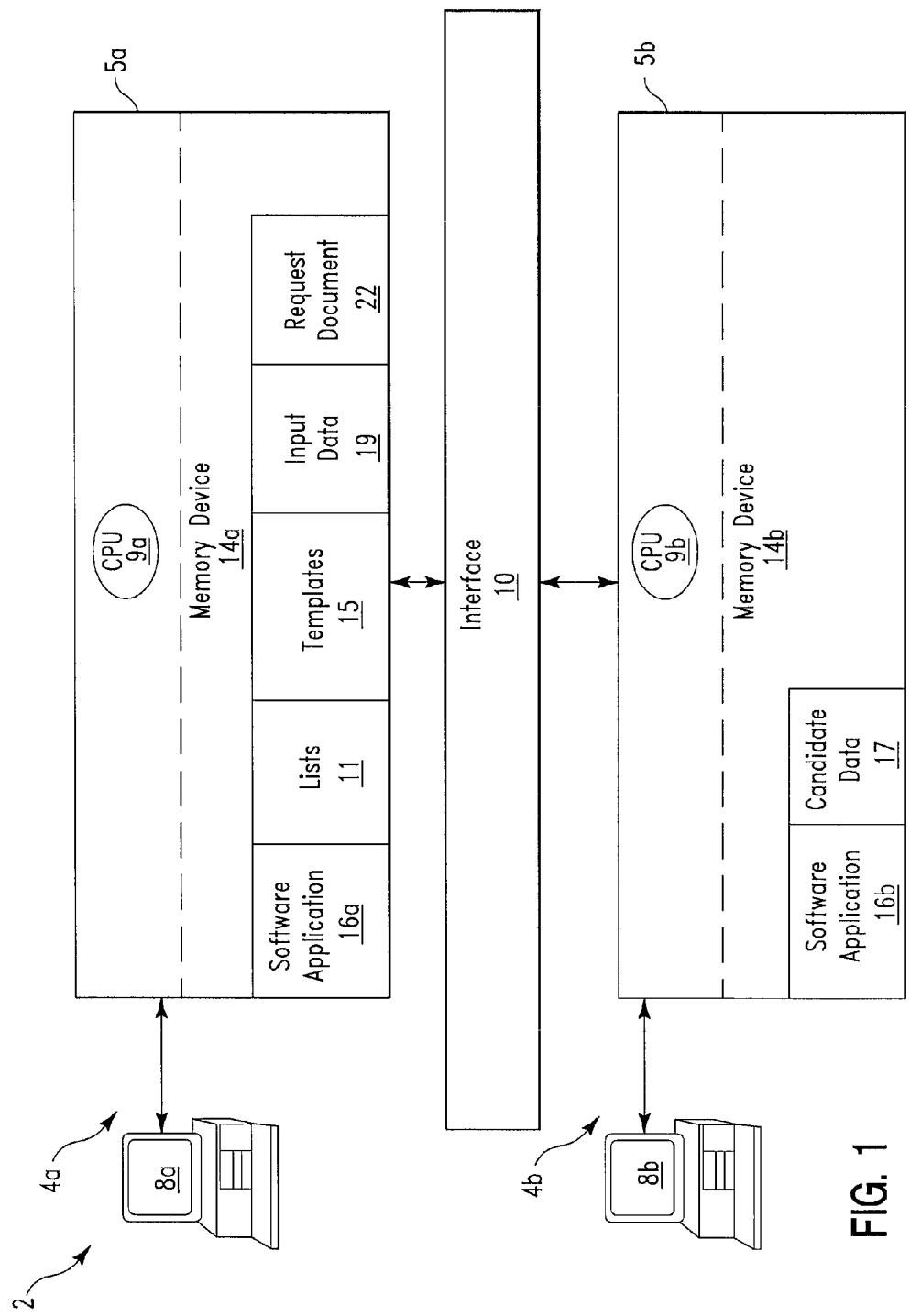
FIG. 1 illustrates a block diagram of a system for generating a modified candidate request, in accordance with embodiments of the present invention.

FIG. 1 illustrates a block diagram of a system 2 for generating a modified candidate request, in accordance with embodiments of the present invention. System 2 may be used for:
1. Allowing a user (e.g., a requester using terminal 8a) to generate a request for candidates (e.g., contractors, job applicants, etc) for job openings (i.e., comprising a specified skill or skill set).
2. Sending the request to a supplier (e.g., an employment agency).
3. Receiving a reply (i.e., a list of candidates) from the supplier.
4. Evaluating the list of candidates.
5. Modifying the original request based on specified events (i.e., scenarios A-E) as described with respect to the real life implementation example as described with respect to FIGS. 9-19, infra.

A requester is defined herein as a person/people (e.g., users from an entity such as, inter alia, a company) looking for a candidate or resource (i.e., a person/people with a specific skill(s)) to fill an open job position. A supplier is defined herein as a person at an external entity or company (e.g., an employment agency) capable of satisfying candidate requests. The requester interacts with a software application (e.g., software application 16a) to select a specified candidate skill (e.g., a "hot" or frequently requested skill or high demand skill, such as, inter alia, a Java programmer, etc) related to a job opening. The specified candidate skill may be selected from a list of candidate skills. In response to the selected specified candidate skill, the software application (e.g., software application 16a) presents a template(s) (e.g., templates 15) in the form of questions or fields associated with the selected specified candidate skill. The templates may comprise a skills details template, a request details template, etc. A request details template comprises general questions or fields related to the candidate request type. For example, the request details template may comprise questions related to, inter alia, a project name, location for placing a candidate comprising the requested skills, project coordinators, the requesting company and department, accounting information, etc. Information retrieved from the request details template (input data in response to the questions from the request details template as described, infra) is shared among several requested skills so therefore the request details template may be considered the header of the request. A skills details template may comprise questions related to skills details such as, inter alia, time frames (i.e., for hiring candidates), skill levels, status levels, etc. The requester will input data (e.g., input data 19) into computing apparatus 4a in response to the questions from the templates. After all of the input data has been entered, the computing apparatus generates a candidate request document and transmits a copy of the candidate request document to a supplier(s). The candidate request document may be stored in memory device 14a. A supplier(s) interacts with a software application (e.g., software application 16b) to identify appropriate candidates associated with the candidate request document. The supplier generates and transmits (i.e., to the requester) a list of appropriate candidates comprising the requested skill identified the requester. The requester evaluates the list of candidates from the supplier evaluates the list of candidates to determine if any candidates on the list appear to be qualified to perform the requested skill(s). As an example, if the requester determines that there are no qualified candidates on the list, the requester may modify the original candidate request document and generate a modified candidate request document. The modified request document may be stored in memory device 14a. The requester generates the modified request document by replacing portion of the original input data (i.e., in response to the questions from the template) with new input data. The modified request document is transmitted to the original supplier and/or new suppliers for a new list of candidates.

System 2 comprises a computing system 4a (e.g., a server) connected to a computing system 4b (e.g., a server) through an interface 10. Interface 10 may comprise any type of interface known to a person of ordinary skill in the art including, inter alia, a local area network, (LAN), a wide area network (WAN), the Internet, etc. Computing system 4a comprises a computing apparatus 5a and an interface terminal 8a. Computing system 4b comprises a computing apparatus 5b and an interface terminal 8b. Computing apparatus 5a comprises a CPU 9a and a memory device 14a. Alternatively, memory device 14a may be located external to computing apparatus 5a. Memory device 14a comprises a software application 16a, lists 11, templates 15, input data 19, and request documents 22. Lists 11, templates 15, and input data 19 may be inputted into computing apparatus 5a through interface terminal 8a. Request documents 22 may comprise original request documents and modified request documents. Computing apparatus 5b comprises a CPU 9b and a memory device 14b. Alternatively, memory device 14b may be located external to computing apparatus 5b. Candidate data 17 (i.e., comprising lists of candidates and responses from the suppliers) may be inputted into computing apparatus 5b through interface terminal 8b.

In order to initiate a process generating and modifying a request document, a requester logs into computing system 5a.

The following process steps illustrate an example of a process (i.e., using system 2) for generating and modifying a request document.

1. For a given project there is a need to hire candidates/resources with a given skill set. A project may be performed either in a company (i.e., requesting company) location or an alternative location such a customer location, temporary location, etc.
2. The requester logs in into software application 16a to create a request document for requested skills. In response, computing apparatus presents to the requester a template comprising questions. Using the template, the requester may select any type of request such as new, referral, or renewal and continue to input request details data such as, inter alia, project name, type of request, project coordinators, accounting information, etc.
3. The requester may additionally input skills details data such as, inter alia, a job role, a job position details, dates, work location, etc.
4. The requester will select a primary skill from which a service type will be determined.
5. A skill level may be selected for core skills and secondary skills.
6. If requested skill is renewal or referral, the requester will have to provide candidate information.
7. The requester will select a supplier(s).
8. Once requester has finished inputting data into the template, software application 16a will generate a request document.
9. The request document is transmitted to the supplier along with an email notification.
10. The supplier reviews the request document and generates a list of candidates for the requester.
11. As an example, upon reviewing the list of candidates, the requester identifies that the needs cannot be fulfilled by the candidates on the list so the request document may be cancelled or modified.
12. The requester has the ability to modify portions of information (i.e., input data) or change the scope of the request. There are two types of input data that may be changed:
   12a. Request details data—The requester may modify request details such as project coordinators, response reviewers, or any substantial information that may require the list of candidates being reviewed to be resubmitted again by the supplier.
   12b. Skills details data—The requester may modify skills details such as such as requirements, dates and times, core or secondary skills, supplier information.
13. Once the requester has modified or changed the request document, he/she will be redirected to a screen where the modifications may be reviewed. At this point, the requester will be able to resubmit the changes so the information will get updated for the supplier.
   13a. Information changes—If there are changes to the request document that are considered pure information such as project coordinators, resume reviewers, or accounting information, the resubmit action will be only an update to the supplier without affecting any of the candidates on the list.
   13b. Scope change—If there are changes to the request document that modify substantial information that may require the candidates being reviewed and resubmitted again by the supplier these changes are considered to be scope changes.

Figure 2A:
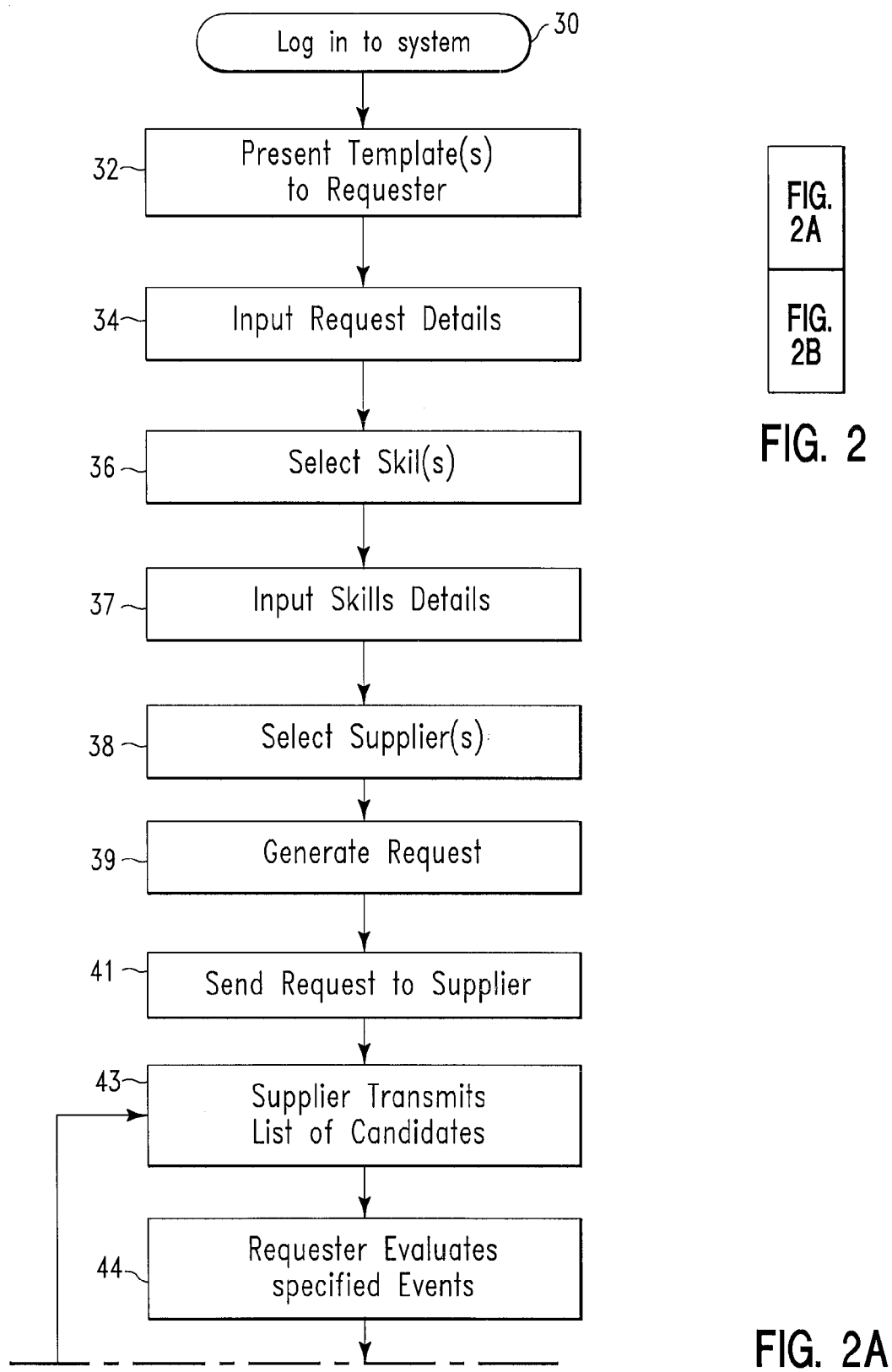
FIGS. 2a and 2b illustrates a flowchart describing an algorithm used by the system of FIG. 1 for generating a modified candidate request, in accordance with embodiments of the present invention.
Figure 2B:
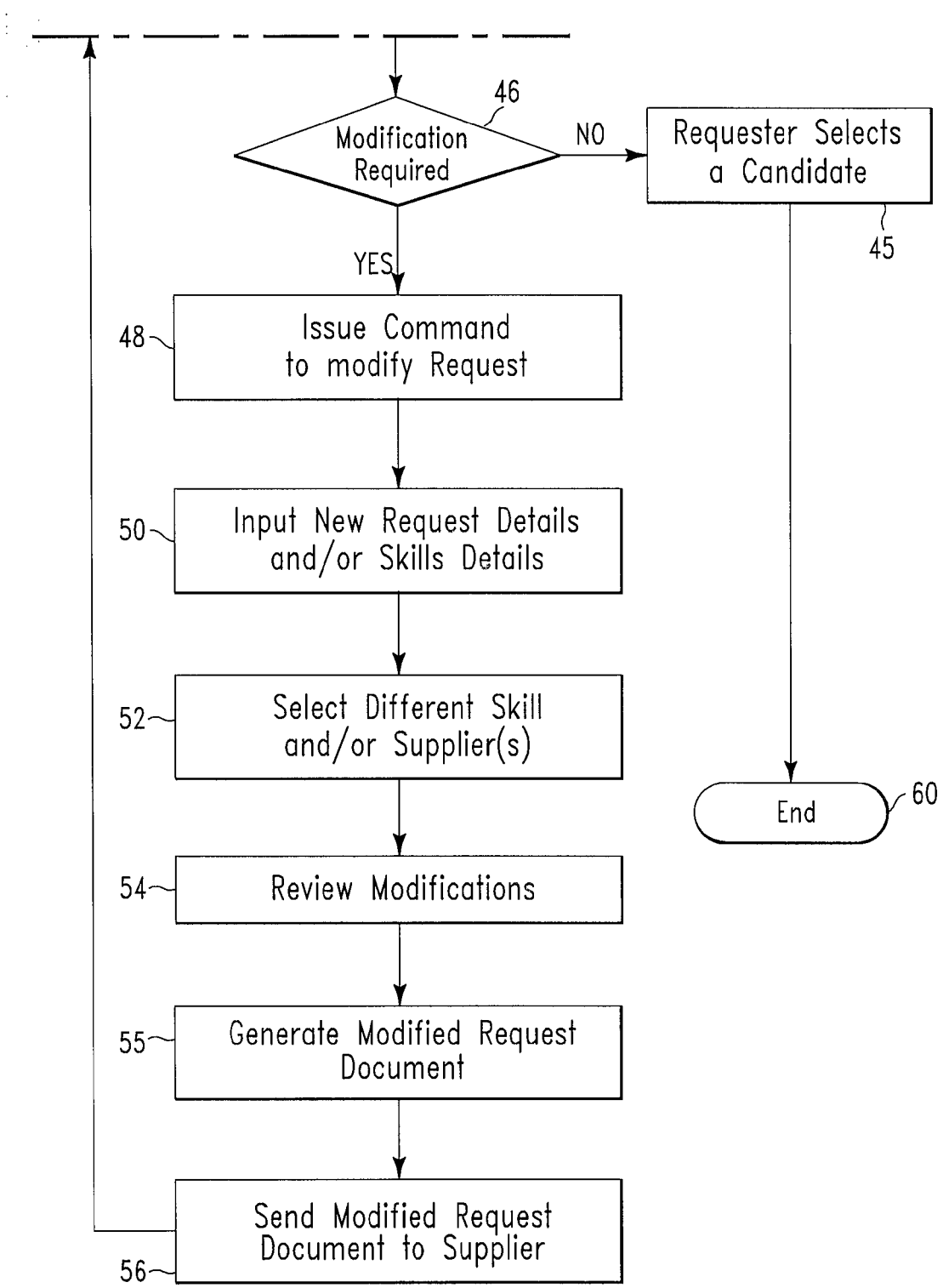

FIGS. 2a and 2b illustrates a flowchart describing an algorithm used by system 2 of FIG. 1 for generating a modified candidate request, in accordance with embodiments of the present invention. In step 30, a requester logs into the computing system (e.g., computing system 4a of FIG. 1). In step 32, the computing system (e.g., computing system 4a in FIG. 1) presents the requester a request template for generating a request document. In step 34, the requester inputs (i.e., via terminal 8a of FIG. 1) request details data into the computing system. In step 36, the requester is presented a list of skills and the requester selects a needed skill. In step 37, the requester inputs (i.e., via terminal 8a of FIG. 1) skills details data into the computing system. In step 38, the requester is presented a list of suppliers and the requester selects a supplier(s). Alternatively, the requester may enter a supplier that is not on the list. In step 39, the computing system generates a request document. In step 41, the request document is transmitted to the supplier. In step 43, the supplier generates a list of candidates and transmits the list to the requester. In step 44, the requester evaluates specified events. In step 46, specified events determine if the request document requires a modification.

If in step 46, the specified events determine that the request document does not require a modification then in step 45, the requester selects a candidate from the list and the process terminates in step 60.

If in step 46, the specified events determine that the request document does require a modification then in step 48, the requester issues a command to modify the request document. In step 50, the requester inputs new request details data and or new skills input data. In step 52, the requester may select a different skill and/or supplier(s). In step 54, the requester reviews all modifications. In step 55, the computing system generates a modified request document. In step 56, the modified request document is transmitted to the originally selected supplier and/or any additionally selected supplier(s) and step 43 is repeated.

FIG. 3 illustrates an example of a computer screen shot 300 (e.g., displayed on interface terminal 8a of FIG. 1) associated with step 48 of FIG. 2, in accordance with embodiments of the present invention. In FIG. 3, the computing system displays a computer screen shot 300 to allow a requester to generate a modified request document. Screen section 305 illustrates request details data. Screen section 308 illustrates skills details data. Screen section 310 illustrates the requested skill. Screen section 315 illustrates a supplier list attachment. Modify request button 325 is enabled in order to initiate the modification process.

FIG. 4 illustrates an example of a computer screen shot 400 (e.g., displayed on interface terminal 8a of FIG. 1) associated with step 50 of FIG. 2, in accordance with embodiments of the present invention. In FIG. 4, the computing system displays computer screen shot 400 to allow request details data 405 and skills details data 408 to be modified. The requester may modify request details data 405 such as, inter alia, project coordinators and response reviewers. Additionally, the requester may modify a scope of the request document by changing the request type and/or the attachment by clicking on modify request details button 410. A scope change comprises modifying substantial information that may require the candidates that are being reviewed to be resubmitted again by the supplier. Skills details data 408 may comprise information such as, inter alia, information such as skill details, requirements, dates and times, core or secondary skills, supplier information, etc.

FIG. 5 illustrates an example of a computer screen shot 500 (e.g., displayed on interface terminal 8a of FIG. 1) associated with step 50 of FIG. 2, in accordance with embodiments of the present invention. In FIG. 5, the computing system displays computer screen shot 500 to allow the requester to modify a project coordinator, resume reviewer, or accounting information. These changes will be considered informational. If the requester modifies a request type or attachment, a change of scope will be considered since the request type change involves a different procurement process and the attachment may contain sensitive information that must be considered by the supplier in order to provide candidates.

FIG. 6 illustrates an example of a computer screen shot 600 (e.g., displayed on interface terminal 8a of FIG. 1) associated with step 50 and step 52 of FIG. 2, in accordance with embodiments of the present invention. In FIG. 6, the computing system displays computer screen shot 600 to allow the requester to modify skills details. Screen shot 600 allows the requester to select specified sections to be modified. The checkbox section in section 602 is used to specify what sections will be displayed in a next screens (i.e., see FIGS. 7a-7d). If the requester would like to modify several fields, such as the requested quantity, add secondary skills, and modify the supplier list, the three check boxes for the aforementioned field will be selected (i.e., by adding a check mark). When the continue button 604 is enabled, the screen shots in FIGS. 7a-7d are produced for the requester.

FIGS. 7a-7d illustrates portions 705a, 705b, and 705c of a example of a computer screen 700 (e.g., displayed on interface terminal 8a of FIG. 1) associated with step 50 and step 52 of FIG. 2, in accordance with embodiments of the present invention.

FIGS. 7a and 7b in combination illustrate portion 705a of computer screen 700 (e.g., displayed on interface terminal 8a of FIG. 1), in accordance with embodiments of the present invention. In FIG. 7a, the computing system displays portion 705a to allow the requester to modify skills details data, requirements, dates, and times, a requested quantity, years of experience, position details (e.g., work shift, travel, etc), estimated dates such as start date, end date and due date, etc.

FIG. 7c illustrates portion 705b of computer screen 700 (e.g., displayed on interface terminal 8a of FIG. 1), in accordance with embodiments of the present invention. In FIG. 7b, the computing system displays portion 705b to allow the requester to modify core and secondary skills. The requester may modify a requested level for all the core skills related with the selected job role. Additionally, the requester may add, remove, or modify a level required for the secondary skills.

Figure 7D:
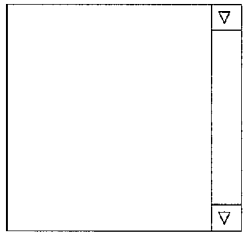

FIG. 7d illustrates portion 705c of computer screen 700 (e.g., displayed on interface terminal 8a of FIG. 1), in accordance with embodiments of the present invention. In FIG. 7c, the computing system displays portion 705c to allow the requester to add or remove suppliers to the current request. If the requester adds suppliers, the request will be sent to the additional suppliers along with an email notification. If the requester removes suppliers, the request will be marked as a cancel order for the removed suppliers and an email notification is transmitted.

FIG. 8 illustrates an example of a computer screen shot 800 (e.g., displayed on interface terminal 8a of FIG. 1) associated with step 55 of FIG. 2, in accordance with embodiments of the present invention. In FIG. 8, the computing system displays computer screen shot 800 to allow the requester to review the modified request document. Screen shot 800 illustrates a summary of a modified request document. If there are modifications related to skills details data, section 161 is used. If there are modifications related to request details data, button 162 is enabled.

FIGS. 9-19 illustrate computer screen shots (e.g., displayed on interface terminal 8a of FIG. 1) associated with a real life implementation example for system 2 of FIG. 1, in accordance with embodiments of the present invention. In the following example, the requester submits a request document with the following characteristics:

Project Name: Project A
Requested for Review Date/Time: 17 Nov. 2006 17:18:42
Requester Comment:
Skill required: Application Developer
Detailed Description:
Start Date: 17 Nov. 2006
End Date: 16 Nov. 2007
Work Location City: ENDICOTT
Work Location Street Address: Company A, 123 NORTH STREET
Location state/region: New York
Company A or Customer Site Location Name: Company A location
Location Country United States
Location Work Region: NORTH EAST
Straight Time: 70.0000 (total H)
Overtime: 80.0000 (total H)
Work At: Company A location
Work Shift:
Weekend Coverage: Weekend coverage is not required.
On-Call Coverage: On call coverage is not required.
Travel Required: Travel is not required.
This request is for a new resource: false
Level: Band 5 (Journeyman)
Quantity: 1
Hot Skill: false
Years of Experience Required:
Education Requirements:
Travel Required: Travel is not required.

Any of the following scenarios (A-E) would require the request document to be modified.

A. Start and end dates need to be updated as it took longer than expected to decide on a contractor or get responses from the suppliers that matched their requirements. This is accomplished using section 161 of FIG. 8.
B. The skill required needs to be updated to make it more specific in order to help the suppliers to locate better matches in the resumes. This is accomplished using section 161 of FIG. 8.
C. The resumes received are not enough so they need to add more suppliers. This is accomplished using section 161 of FIG. 8.
D. Remove suppliers if the suppliers indicate they cannot fill the request. This is accomplished using section 161 of FIG. 8.
E. Update the project coordinators and/or resume reviewer due to a coordinator that has left the company or is on vacation. This is accomplished using section 162 of FIG. 8.

FIGS. 9-19 illustrate a sample process to modify the request document.

FIG. 9 illustrates computer screen shot 900, in accordance with embodiments of the present invention. Computer screen shot 900 allows the requester to select a request document 901 for modification.

FIG. 10 illustrates computer screen shot 150, in accordance with embodiments of the present invention. Computer screen shot 150 allows the requester to enable modify request button 155 in order to initiate the modification process.

FIG. 11 illustrates computer screen shot 260, in accordance with embodiments of the present invention. Computer screen shot 260 allows the requester to identify and select data type for modification according to scenario A as described, supra.

FIG. 12 illustrates computer screen shot 360, in accordance with embodiments of the present invention. Computer screen shot 360 allows the requester to identify and select data type for modification according to scenarios B as described, supra.

FIG. 13 illustrates computer screen shot 460, in accordance with embodiments of the present invention. Computer screen shot 460 allows the requester to identify and select data type for modification according to a combination of scenarios C and D as described, supra.

FIG. 14 illustrates computer screen shot 560, in accordance with embodiments of the present invention. Computer screen shot 560 allows the requester to modify start and end dates for submitting candidates.

FIG. 15 illustrates computer screen shot 660, in accordance with embodiments of the present invention. Computer screen shot 660 allows the requester to modify required skills in order to enable suppliers to locate candidates.

FIG. 16 illustrates computer screen shot 760, in accordance with embodiments of the present invention. Computer screen shot 760 allows the requester to add additional suppliers to the request document.

FIG. 17 illustrates computer screen shot 860, in accordance with embodiments of the present invention. Computer screen shot 860 allows the requester to remove suppliers from the request document.

FIG. 18 illustrates computer screen shot 960, in accordance with embodiments of the present invention. Computer screen shot 960 allows the requester to update project coordinators according to scenario E as described, supra.

FIG. 19 illustrates computer screen shot 980, in accordance with embodiments of the present invention. Computer screen shot 980 allows the requester to review the modified request document. Section 982 allows the requester to enable a modified request document.

Figure 20:
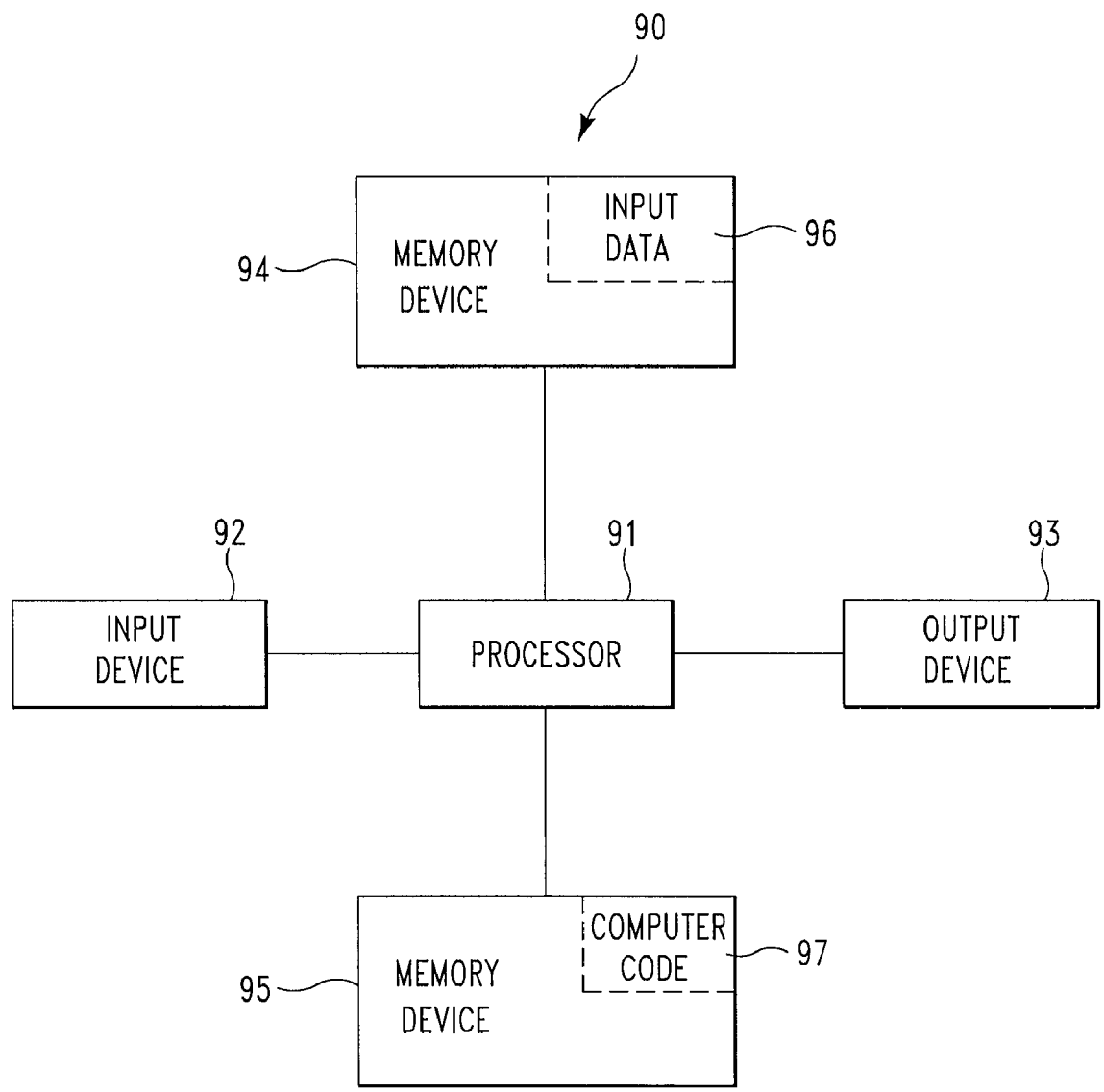
FIG. 20 illustrates a computer system (i.e., the computing system in FIG. 1) used for generating a modified request document, in accordance with embodiments of the present invention.

FIG. 20 illustrates a computer system 90 (i.e., computing system 4a and/or 4b in FIG. 1) used for generating a modified request document, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithm of FIG. 2) for generating a modified request document. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 20) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to generate a modified request document. Thus the present invention discloses a process for deploying or integrating computing infrastructure, comprising integrating computer-readable code into the computer system 90, wherein the code in combination with the computer system 90 is capable of performing a method for generating a modified request document. In another embodiment, the invention provides a business method that performs the process steps of the invention on a subscription, advertising, and/or fee basis. That is, a service provider, such as a Solution Integrator, could offer to generate a modified request document. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 20 shows the computer system 90 as a particular configuration of hardware and software, any configuration of hardware and software, as would be known to a person of ordinary skill in the art, may be utilized for the purposes stated supra in conjunction with the particular computer system 90 of FIG. 20. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A modification method comprising:
presenting, by a computing system to a requester, a request details template associated with a candidate request, said computing system comprising a memory device, said memory device comprising said request details template, a skills details template associated with said candidate request, a first list of candidate skills, and a first list of suppliers, said request details template consisting of a plurality of request details questions and request details headers consisting of: a project name header, a requesting company header, a requesting organization header, a status header, a tracking number header, a project coordinator header, a reviewer header, and an accounting header, said skills details template comprising a plurality of skills details questions, said first list of candidate skills comprising skill levels for primary skills and secondary skills;
receiving, by said computing system from said requester, first data comprising: a status of said candidate request, a tracking number of said candidate request, and an accounting number of said candidate request;
receiving, by said computing system from said requester, first request details data associated with said request details template;
presenting, by said computing system, said first list of candidate skills to said requester;
receiving from said requester, by said computing system, a first selection of a first candidate skill from said first list of candidate skills;
presenting, by said computing system, said skills details template to said requester;
receiving from said requester, by said computing system, first skills details data associated with said skills details template, said first skills details data consisting of skill requirements including educational requirements for performing specified skills;

presenting, by said computing system, said first list of suppliers to said requester;

receiving from said requester, by said computing system, a first selection of at least a first supplier from said first list of suppliers;

generating, by a computer processor of said computing system, a request document consisting of said first data, said first selection of said first candidate skill, said first selection of said at least said first supplier, said first skills details data, said first request details data, a response due date, and a request status;

presenting, by said computing system to said requestor, said request document;

transmitting, by said computing system, said request document to said at least said first supplier;

receiving from said at least said first supplier, by said computing system, a first list of candidates, each candidate of said first list of candidates associated with said request document;

presenting, by said computing system, a first computer screen interface comprising said first list of candidates to said requester;

receiving from said requester, by said computing system based on said first computer screen interface, a request for modifying said request document;

presenting, by said computing system in response to said request for modifying said request document, a modify request screen interface, wherein said modify request screen interface consists of a primary job rate header, a work location header, a position details header, an estimate of time header, a core and secondary skills selection portion, and an add or remove suppliers portion;

receiving from said requester, by said computing system, first selections within said modify request screen interface, wherein said first selections comprise: a primary job category selection, a secondary job category selection, a skill level selection, a years of experience selection, an educational requirement selection, a selection for a first, second, third, or fourth work shift, a weekend coverage selection, an on-call coverage selection, a travel requirement selection, a client asset loan selection, a planned start date selection, a planned end date selection, a time related unit of measure selection, a selection for straight time, a selection for overtime, and a response due date selection;

receiving from said requester, by said computing system, second selections within said core and secondary skills portion, wherein said second selections comprise: an advise on a language for a supply chain selection, a programming languages selection, a language for financials selection, and an application for testing activities selection;

receiving from said requester, by said computing system, third selections within said add or remove suppliers portion, wherein said third selections comprise vendor selections, test supplier selections, and flowdown term selections;

generating, by said computing system in response to said request for modifying said request document, a modified request document comprising a modified version of said request document, wherein said modified request document comprises said first selections, said second selections, and said third selections;

presenting, by said computing system to said requester, said modified request document; and receiving from said requester, by said computing system, approval data approving a transmission of said modified request document.

2. The method of claim 1, further comprising:
transmitting, by said computing system, said modified request document to said at least said first supplier; and
receiving from said at least said first supplier in response to said modified request document, by said computing system, a second list of candidates, each candidate of said second list of candidates associated with said modified request document.

3. The method of claim 1, further comprising:
presenting after said receiving said request for modifying said request document, by said computing system, said first list of suppliers to said requester;
receiving, from said requester, by said computing system, a selection of at least a second supplier from said first list, wherein said modified request document comprises said selection of said at least said second supplier;
transmitting, by said computing system, said modified request document to said at least said second supplier; and
receiving from said at least said second supplier in response to said modified request document, by said computing system, a second list of candidates, each candidate of said second list of candidates associated with said modified request document.

4. The method of claim 1, further comprising:
presenting after said receiving said request for modifying said request document, by said computing system, said first list of candidate skills to said requester; and
receiving, from said requester, by said computing system, a selection of a second candidate skill from said first list, wherein said modified request document comprises said selection of said second candidate skill.

5. The method of claim 1, further comprising:
receiving from said requester, by said computing system, second request details data; and
replacing, by computing system, a portion of said first request details data with said second request details data, wherein said modified request document comprises said second request details data.

6. The method of claim 5, wherein said second request details data comprises data selected from the group consisting of project name data, geographical location data, project coordinator data, requesting company data, and accounting data.

7. The method of claim 1, further comprising:
receiving from said requester, by said computing system, second skills details data; and
replacing, by computing system, a portion of said first skills details data with said second skills details data, wherein said modified request document comprises said second skills details data.

8. The method of claim 7, wherein said second skills details data comprises data selected from the group consisting of time related data, skill level data, and status data.

9. The method of claim 1, further comprising:
updating, by said computing system, project coordinators associated with said request document.

10. A computing system comprising a computer processor coupled to a computer-readable memory unit, said memory unit comprising a request details template, a skills details template, a first list of candidate skills, a first list of suppliers, and instructions that when executed by the processor implement a modification method, said request details template consisting of a plurality of request details questions and request details headers consisting of: a project name header, a requesting company header, a requesting organization header, a status header, a tracking number header, a project coordinator header, a reviewer header, and an accounting header, said skills details template comprising a plurality of skills details questions, said first list of candidate skills comprising skill levels for primary skills and secondary skills, said method comprising:

presenting, by said computing system to a requester, said request details template;

receiving, by said computing system from said requester, first data comprising: a status of said candidate request, a tracking number of said candidate request, and an accounting number of said candidate request;

receiving, by said computing system from said requester, first request details data associated with said request details template;

presenting, by said computing system, said first list of candidate skills to said requester;

receiving from said requester, by said computing system, a first selection of a first candidate skill from said first list of candidate skills;

presenting, by said computing system, said skills details template to said requester;

receiving from said requester, by said computing system, first skills details data associated with said skills details template, said first skills details data consisting of skill requirements including educational requirements for performing specified skills;

presenting, by said computing system, said first list of suppliers to said requester;

receiving from said requester, by said computing system, a first selection of at least a first supplier from said first list of suppliers;

generating, by said computer processor of said computing system, a request document consisting of said first data, said first selection of said first candidate skill, said first selection of said at least said first supplier, said first skills details data, said first request details data, a response due date, and a request status;

presenting, by said computing system to said requestor, said request document;

transmitting, by said computing system, said request document to said at least said first supplier;

receiving from said at least said first supplier, by said computing system, a first list of candidates, each candidate of said first list of candidates associated with said request document;

presenting, by said computing system, a first computer screen interface comprising said first list of candidates to said requester;

receiving from said requester, by said computing system based on said first computer screen interface, a request for modifying said request document;

presenting, by said computing system in response to said request for modifying said request document, a modify request screen interface, wherein said modify request screen interface consists of a primary job rate header, a work location header, a position details header, an estimate of time header, a core and secondary skills selection portion, and an add or remove suppliers portion;

receiving from said requester, by said computing system, first selections within said modify request screen interface, wherein said first selections comprise: a primary job category selection, a secondary job category selection, a skill level selection, a years of experience selection, an educational requirement selection, a selection for a first, second, third, or fourth work shift, a weekend coverage selection, an on-call coverage selection, a travel requirement selection, a client asset loan selection, a planned start date selection, a planned end date selection, a time related unit of measure selection, a selection for straight time, a selection for overtime, and a response due date selection;

receiving from said requester, by said computing system, second selections within said core and secondary skills portion, wherein said second selections comprise: an advise on a language for a supply chain selection, a programming languages selection, a language for financials selection, and an application for testing activities selection;

receiving from said requester, by said computing system, third selections within said add or remove suppliers portion, wherein said third selections comprise vendor selections, test supplier selections, and flowdown term selections;

generating, by said computing system in response to said request for modifying said request document, a modified request document comprising a modified version of said request document, wherein said modified request document comprises said first selections, said second selections, and said third selections;

presenting, by said computing system to said requester, said modified request document; and receiving from said requester, by said computing system, approval data approving a transmission of said modified request document.

11. The computing system of claim 10, wherein said method further comprises:

transmitting, by said computing system, said modified request document to said at least said first supplier; and receiving from said at least said first supplier in response to said modified request document, by said computing system, a second list of candidates, each candidate of said second list of candidates associated with said modified request document.

12. The computing system of claim 10, wherein said method further comprises:

presenting after said receiving said request for modifying said request document, by said computing system, said first list of suppliers to said requester;

receiving, from said requester, by said computing system, a selection of at least a second supplier from said first list, wherein said modified request document comprises said selection of said at least said second supplier;

transmitting, by said computing system, said modified request document to said at least said second supplier; and receiving from said at least said second supplier in response to said modified request document, by said computing system, a second list of candidates, each candidate of said second list of candidates associated with said modified request document.

13. The computing system of claim 10, wherein said method further comprises:

presenting after said receiving said request for modifying said request document, by said computing system, said first list of candidate skills to said requester; and receiving, from said requester, by said computing system, a selection of a second candidate skill from said first list, wherein said modified request document comprises said selection of said second candidate skill.

14. The computing system of claim 10, wherein said method further comprises:
  receiving from said requester, by said computing system, second request details data; and
  replacing, by computing system, a portion of said first request details data with said second request details data, wherein said modified request document comprises said second request details data.

15. The computing system of claim 14, wherein said second request details data comprises data selected from the group consisting of project name data, geographical location data, project coordinator data, requesting company data, and accounting data.

16. The computing system of claim 10, wherein said method further comprises:
  receiving from said requester, by said computing system, second skills details data; and
  replacing, by computing system, a portion of said first skills details data with said second skills details data, wherein said modified request document comprises said second skills details data.

17. The computing system of claim 16, wherein said second skills details data comprises data selected from the group consisting of time related data, skill level data, and status data.

18. A computer program product, comprising a computer readable storage medium comprising a request details template, a skills details template, a first list of candidate skills, a first list of suppliers, and a computer readable program code embodied therein, said request details template consisting of a plurality of request details questions and request details headers consisting of: a project name header, a requesting company header, a requesting organization header, a status header, a tracking number header, a project coordinator header, a reviewer header, and an accounting header, said skills details template comprising a plurality of skills details questions, said first list of candidate skills comprising skill levels for primary skills and secondary skills, said computer readable program code comprising an algorithm that when executed by a computer processor of an a computing system implements a method comprising:
  receiving, by said computing system from said requester, first data comprising: a status of said candidate request, a tracking number of said candidate request, and an accounting number of said candidate request;
  receiving, by said computing system from said requester, first request details data associated with said request details template;
  presenting, by said computing system, said first list of candidate skills to said requester;
  receiving from said requester, by said computing system, a first selection of a first candidate skill from said first list of candidate skills;
  presenting, by said computing system, said skills details template to said requester;
  receiving from said requester, by said computing system, first skills details data associated with said skills details template, said first skills details data consisting of skill requirements including educational requirements for performing specified skills;
  presenting, by said computing system, said first list of suppliers to said requester;
  receiving from said requester, by said computing system, a first selection of at least a first supplier from said first list of suppliers;
  generating, by said computer processor of said computing system, a request document consisting of said first data, said first selection of said first candidate skill, said first selection of said at least said first supplier, said first skills details data, said first request details data, a response due date, and a request status;
  presenting, by said computing system to said requestor, said request document;
  transmitting, by said computing system, said request document to said at least said first supplier;
  receiving from said at least said first supplier, by said computing system, a first list of candidates, each candidate of said first list of candidates associated with said request document;
  presenting, by said computing system, a first computer screen interface comprising said first list of candidates to said requester;
  receiving from said requester, by said computing system based on said first computer screen interface, a request for modifying said request document;
  presenting, by said computing system in response to said request for modifying said request document, a modify request screen interface, wherein said modify request screen interface consists of a primary job rate header, a work location header, a position details header, an estimate of time header, a core and secondary skills selection portion, and an add or remove suppliers portion;
  receiving from said requester, by said computing system, first selections within said modify request screen interface, wherein said first selections comprise: a primary job category selection, a secondary job category selection, a skill level selection, a years of experience selection, an educational requirement selection, a selection for a first, second, third, or fourth work shift, a weekend coverage selection, an on-call coverage selection, a travel requirement selection, a client asset loan selection, a planned start date selection, a planned end date selection, a time related unit of measure selection, a selection for straight time, a selection for overtime, and a response due date selection;
  receiving from said requester, by said computing system, second selections within said core and secondary skills portion, wherein said second selections comprise: an advise on a language for a supply chain selection, a programming languages selection, a language for financials selection, and an application for testing activities selection;
  receiving from said requester, by said computing system, third selections within said add or remove suppliers portion, wherein said third selections comprise vendor selections, test supplier selections, and flowdown term selections;
  generating, by said computing system in response to said request for modifying said request document, a modified request document comprising a modified version of said request document, wherein said modified request document comprises said first selections, said second selections, and said third selections;
  presenting, by said computing system to said requester, said modified request document; and
  receiving from said requester, by said computing system, approval data approving a transmission of said modified request document.

19. The computer program product of claim 18, wherein said method further comprises:
  transmitting, by said computing system, said modified request document to said at least said first supplier; and
  receiving from said at least said first supplier in response to said modified request document, by said computing system, a second list of candidates, each candidate of said second list of candidates associated with said modified request document.

20. The computer program product of claim 18, wherein said method further comprises:
presenting after said receiving said request for modifying said request document, by said computing system, said first list of suppliers to said requester;
receiving, from said requester, by said computing system, a selection of at least a second supplier from said first list, wherein said modified request document comprises said selection of said at least said second supplier;
transmitting, by said computing system, said modified request document to said at least said second supplier; and
receiving from said at least said second supplier in response to said modified request document, by said computing system, a second list of candidates, each candidate of said second list of candidates associated with said modified request document.

21. The computer program product of claim 18, wherein said method further comprises:
presenting after said receiving said request for modifying said request document, by said computing system, said first list of candidate skills to said requester; and
receiving, from said requester, by said computing system, a selection of a second candidate skill from said first list, wherein said modified request document comprises said selection of said second candidate skill.

22. The computer program product of claim 18, wherein said method further comprises:
receiving from said requester, by said computing system, second request details data; and
replacing, by computing system, a portion of said first request details data with said second request details data, wherein said modified request document comprises said second request details data.

23. The computer program product of claim 22, wherein said second request details data comprises data selected from the group consisting of project name data, geographical location data, project coordinator data, requesting company data, and accounting data.

24. The computer program product of claim 18, wherein said method further comprises:
receiving from said requester, by said computing system, second skills details data; and
replacing, by computing system, a portion of said first skills details data with said second skills details data, wherein said modified request document comprises said second skills details data.

25. The computer program product of claim 24, wherein said second skills details data comprises data selected from the group consisting of time related data, skill level data, and status data.

26. A process for supporting computer infrastructure, said process comprising providing at least one support service for at least one of creating, integrating, hosting, maintaining, and deploying computer-readable code in a computing system comprising a memory unit, said memory unit comprising a request details template, a skills details template, a first list of candidate skills, and a first list of suppliers, said request details template consisting of a plurality of request details questions and request details headers consisting of: a project name header, a requesting company header, a requesting organization header, a status header, a tracking number header, a project coordinator header, a reviewer header, and an accounting header, said skills details template comprising a plurality of skills details questions, said first list of candidate skills comprising skill levels for primary skills and secondary skills, said method comprising:
presenting, by said computing system to a requester, said request details template;
receiving, by said computing system from said requester, first data comprising: a status of said candidate request, a tracking number of said candidate request, and an accounting number of said candidate request;
receiving, by said computing system from said requester, first request details data associated with said request details template;
presenting, by said computing system, said first list of candidate skills to said requester;
receiving from said requester, by said computing system, a first selection of a first candidate skill from said first list of candidate skills;
presenting, by said computing system, said skills details template to said requester;
receiving from said requester, by said computing system, first skills details data associated with said skills details template, said first skills details data consisting of skill requirements including educational requirements for performing specified skills;
presenting, by said computing system, said first list of suppliers to said requester;
receiving from said requester, by said computing system, a first selection of at least a first supplier from said first list of suppliers;
generating, by a computer processor of said computing system, a request document consisting of said first data, said first selection of said first candidate skill, said first selection of said at least said first supplier, said first skills details data, said first request details data, a response due date, and a request status;
presenting, by said computing system to said requestor, said request document;
transmitting, by said computing system, said request document to said at least said first supplier;
receiving from said at least said first supplier, by said computing system, a first list of candidates, each candidate of said first list of candidates associated with said request document;
presenting, by said computing system, a first computer screen interface comprising said first list of candidates to said requester;
receiving from said requester, by said computing system based on said first computer screen interface, a request for modifying said request document;
presenting, by said computing system in response to said request for modifying said request document, a modify request screen interface, wherein said modify request screen interface consists of a primary job rate header, a work location header, a position details header, an estimate of time header, a core and secondary skills selection portion, and an add or remove suppliers portion;
receiving from said requester, by said computing system, first selections within said modify request screen interface, wherein said first selections comprise: a primary job category selection, a secondary job category selection, a skill level selection, a years of experience selection, an educational requirement selection, a selection for a first, second, third, or fourth work shift, a weekend coverage selection, an on-call coverage selection, a travel requirement selection, a client asset loan selection, a planned start date selection, a planned end date selection, a time related unit of measure selection, a selection for straight time, a selection for overtime, and a response due date selection;

receiving from said requester, by said computing system, second selections within said core and secondary skills portion, wherein said second selections comprise: an advise on a language for a supply chain selection, a programming languages selection, a language for financials selection, and an application for testing activities selection;

receiving from said requester, by said computing system, third selections within said add or remove suppliers portion, wherein said third selections comprise vendor selections, test supplier selections, and flowdown term selections;

generating, by said computing system in response to said request for modifying said request document, a modified request document comprising a modified version of said request document, wherein said modified request document comprises said first selections, said second selections, and said third selections;

presenting, by said computing system to said requester, said modified request document; and receiving from said requester, by said computing system, approval data approving a transmission of said modified request document.

27. The process of claim 26, wherein said method further comprises:

transmitting, by said computing system, said modified request document to said at least said first supplier; and receiving from said at least said first supplier in response to said modified request document, by said computing system, a second list of candidates, each candidate of said second list of candidates associated with said modified request document.

28. The process of claim 26, wherein said method further comprises:

presenting after said receiving said request for modifying said request document, by said computing system, said first list of suppliers to said requester;

receiving, from said requester, by said computing system, a selection of at least a second supplier from said first list, wherein said modified request document comprises said selection of said at least said second supplier;

transmitting, by said computing system, said modified request document to said at least said second supplier; and receiving from said at least said second supplier in response to said modified request document, by said computing system, a second list of candidates, each candidate of said second list of candidates associated with said modified request document.

29. The process of claim 26, wherein said method further comprises:

presenting after said receiving said request for modifying said request document, by said computing system, said first list of candidate skills to said requester; and receiving, from said requester, by said computing system, a selection of a second candidate skill from said first list, wherein said modified request document comprises said selection of said second candidate skill.

30. The process of claim 26, wherein said method further comprises:

receiving from said requester, by said computing system, second request details data; and replacing, by computing system, a portion of said first request details data with said second request details data, wherein said modified request document comprises said second request details data.

31. The process of claim 26, wherein said method further comprises:

receiving from said requester, by said computing system, second skills details data; and replacing, by computing system, a portion of said first skills details data with said second skills details data, wherein said modified request document comprises said second skills details data.

* * * * *